United States Patent [19]

Ito et al.

[11] Patent Number: 4,651,814
[45] Date of Patent: Mar. 24, 1987

[54] WASTE HEAT RECOVERY APPARATUS

[75] Inventors: Kazuhiko Ito, Seto; Jun Yonehara, Ichinomiya; Yoshinari Tanigawa, Tokoname; Minoru Yamaguchi, Handa, all of Japan

[73] Assignee: NGK Insulators, Ltd., Japan

[21] Appl. No.: 805,798

[22] Filed: Dec. 6, 1985

[30] Foreign Application Priority Data

Dec. 17, 1984 [JP] Japan .................. 59-191013[U]

[51] Int. Cl.[4] .................................. F27D 17/00
[52] U.S. Cl. ........................ 165/47; 165/904; 165/901; 432/148; 432/219
[58] Field of Search .................. 165/47, 904, 901; 432/28, 29, 148, 219, 223; 62/55.5

[56] References Cited

U.S. PATENT DOCUMENTS

| | | | |
|---|---|---|---|
| 1,603,631 | 10/1926 | Munhollon | 432/29 |
| 1,677,136 | 7/1928 | Hepburn | 432/148 |
| 1,748,136 | 2/1930 | Lipsius | 432/148 |
| 2,441,594 | 5/1948 | Ramseyer | 432/29 |
| 2,789,521 | 4/1957 | Wasp | 165/904 |
| 3,130,562 | 4/1964 | Wood et al. | 165/904 |
| 3,174,228 | 3/1965 | Smith, Jr. | 165/904 |
| 3,175,373 | 3/1965 | Holkeboer et al. | 62/55.5 |
| 3,360,949 | 1/1968 | Blanchard et al. | 62/55.5 |
| 3,564,648 | 2/1971 | Snow | 432/148 |
| 4,444,554 | 4/1984 | Echigo et al. | 165/904 |

FOREIGN PATENT DOCUMENTS

| | | | |
|---|---|---|---|
| 691329 | 7/1964 | Canada | 165/904 |
| 1377542 | 9/1963 | France | 165/904 |
| 931111 | 7/1963 | United Kingdom . | |

Primary Examiner—William R. Cline
Assistant Examiner—John K. Ford
Attorney, Agent, or Firm—Parkhurst & Oliff

[57] ABSTRACT

A waste heat recovery apparatus is disclosed which recovers the waste heat of high temperature exhaust gas discharged from a furnace. The apparatus includes a radiation body made of ceramic material, which is formed with a heat radiation surface arranged adjacent to an exhaust gas outlet of the furnace, and directed toward the inside of the furnace. The radiation body has a plurality of regular channels allowing passage of the exhaust gas therethrough. Exhaust gas passes through the channels and heats the radiation body, and a substantial amount of the holding heat of the exhaust gas is radiated from the radiation surface toward the inside of the furnace, allowing an efficient waste heat recovery.

4 Claims, 3 Drawing Figures

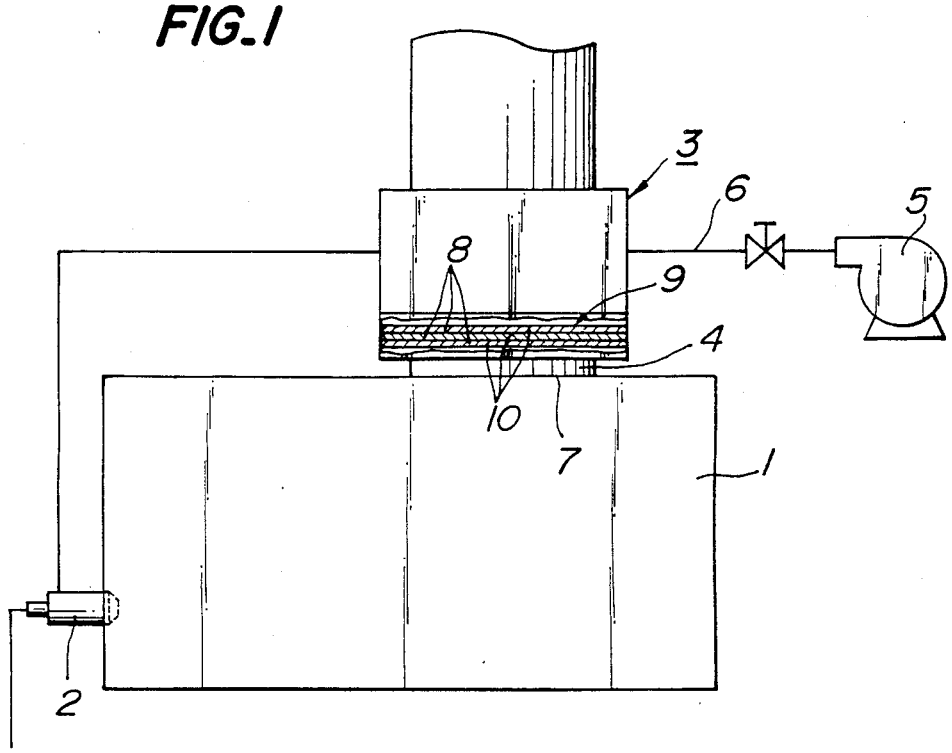
FIG._1
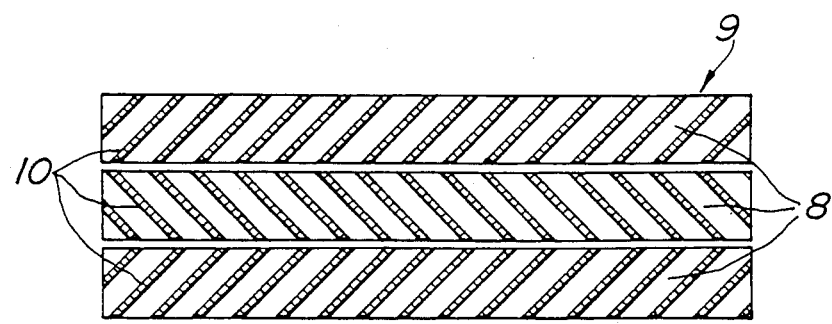
FIG._2

WASTE HEAT RECOVERY APPARATUS

BACKGROUND OF THE INVENTION

1. Field of the Invention

The present invention relates to a waste heat recovery apparatus for the recovery of waste heat of an exhaust gas discharged from a high temperature furnace, such as an industrial furnace.

2. Statement of the Related Art

Conventionally, in order to improve the thermal efficiency of various furnaces, use has been made of heat exchangers for recovering the waste heat of high temperature exhaust gas discharged from the furnace. The recovered waste heat is used, for example, to pre-heat fresh combustion air to be supplied to the furnace. The heat exchanger used for this purpose is generally provided with metallic radiation tubes having a limited heat resistivity. Thus, when the exhaust gas temperature exceeds 800° C., for example, the gas cannot be supplied to the heat exchanger directly because of the insufficient heat resistivity of the metallic radiation tubes.

It has therefore been considered necessary to add a substantial amount of cooling air, or other suitable cooling gas, to the exhaust gas before the latter is supplied to the heat exchanger, to thereby lower the exhaust gas temperature below 800° C. With the addition of the cooling gas, however, exhaust gas post-treating equipment, such as a scrubber, connected on the downstream side of the heat exchanger and used to remove harmful SOx and NOx compositions contained in the exhaust gas, is charged with an increased amount of gas. The capacity of the post-treating equipment has to be increased, and this is disadvantageous from an economical viewpoint. Moreover, in the above-mentioned arrangement of a known waste heat recovery apparatus, the temperature of the exhaust gas discharged from the heat exchanger remains as high as 500°-600° C., even after the recovery of the waste heat by the heat exchanger. The heat recovery rate thus amounts to only 40-50%, so that an improvement in the overall thermal efficiency of the furnace can be achieved only in a limited range. This is due to the fact that a substantial amount of the holding heat of the exhaust gas is wasted as heat added to the cooling gas, and cannot be recovered efficiently.

As an alternative approach, it is known to make use of a heat exchanger with radiation tubes made of a ceramic material, through which the exhaust gas at a temperature above 800° C. can be passed directly, without requiring addition of a cooling gas. However, such a heat exchanger is very expensive and the cost is, for example, 5-10 times higher than that of a conventional metallic radiation tube-type heat exchanger. This approach, too, is quite disadvantageous from an economical viewpoint.

With the above-mentioned prior technology, therefore, it has been considered extremely difficult or almost impossible to efficiently and economically recover the waste heat of high temperature exhaust gas at a temperature as high as 1,000° C. or more.

SUMMARY OF THE INVENTION

Consequently, the present invention contemplates the elimination of the above-mentioned problems, by providing a novel and improved waste heat recovery apparatus which makes it possible to efficiently and economically recover waste heat directly from the exhaust gas at a temperature as high as 1,000° C. or more.

According to the present invention, there is provided a waste heat recovery apparatus for recovering the waste heat of exhaust gas discharged from an exhaust gas outlet of a high-temperature furnace, said apparatus comprising a radiation body which consists essentially of a ceramic material, said radiation body having a heat radiation surface adapted to be arranged near said exhaust gas outlet and toward the inside of the furnace, and a plurality of regular channels extending through the ceramic material from said heat radiation surface and allowing passage of the exhaust gas therethrough.

Provision of the radiation body arranged near the exhaust gas outlet of the furnace makes it possible to primarily recover the heat of the exhaust gas, and to radiate the recovered heat directly into the inside of the furnace, so that the heat recovery rate can be improved considerably. On the other hand, the temperature of the exhaust gas passed through the radiation body has been lowered solely due to the primary heat recovery, so that the heat exchanger to be arranged on the downstream side of the radiation body does not need to be of an expensive structure. Because additional cooling gas is not required to lower the temperature of the exhaust gas to be passed through the heat exchanger, the capacity of the exhaust gas post-treating equipment need not be increased.

BRIEF DESCRIPTION OF THE DRAWINGS

FIG. 1 is a schematic front view, partly in section, of the waste heat recovery apparatus according to one embodiment of the present invention incorporated on a high-temperature furnace;

FIG. 2 is a sectional view, in an enlarged scale, of the apparatus shown in FIG. 1.

DESCRIPTION OF THE PREFERRED EMBODIMENTS

Figure 3:
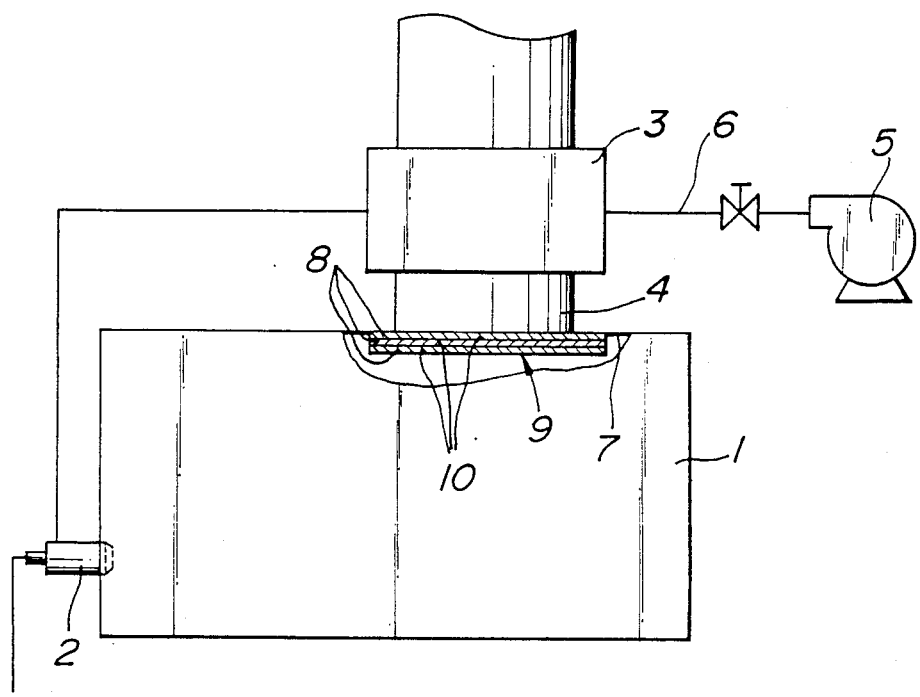
FIG. 3 is a schematic view, similar to FIG. 1, showing another embodiment of the present invention.

Referring now to the accompanying drawings, there is shown in FIG. 1 a high-temperature furnace designated generally by the reference numeral 1, which may be a burning furnace, heating furnace, drying furnace, or the like, and to which the present invention is applied. The furnace 1 has a burner 2 for heating the chamber within the furnace 1, and is associated with a heat exchanger 3 for recovering the waste heat of the exhaust gas discharged from the furnace 1. More particularly, in the illustrated embodiment, the heat exchanger 3 is inserted into an exhaust gas duct 4 which serves to discharge exhaust gas from the furnace 1, and is arranged such that fresh combustion air supplied by a blower 5 under pressure is pre-heated by the recovered waste heat of the exhaust gas. Thus, the heat exchanger 3 is also located in a combustion air passage 6 with one end connected to the blower 5 and another end connected with the burner 2. For this purpose, various types of heat exchangers may be used, such as shell type, radiation tube type, honeycomb type, and the like.

According to the present invention, there is provided a novel waste heat recovery apparatus which is arranged in the vicinity of an exhaust gas discharge opening 7 formed in a wall of the furnace 1, and on the inlet side of the heat exchanger 3. This apparatus has a plurality of regular channels 8 allowing passage of the exhaust gas therethrough, and consists essentially of ceramic material formed as a radiation body 9 with a heat radiation surface disposed toward the inside of the furnace 1. The radiation body 9 in the embodiment illustrated in FIG. 1, is arranged within the housing of the heat exchanger 3 and forms with the latter a unitary assembly.

Preferably, the radiation body 9 comprises a honeycomb structure of a ceramic material, such as cordierite, mullite, alumina or the like, with a plurality of partition walls 10 defining the channels 8. When high-temperature exhaust gas is discharged from the furnace 1 and flows through the duct 4 and channels 8 in the radiation body 9, the radiation body 9 is heated by the exhaust gas and radiates a substantial amount of heat from the heat radiation surface toward the inside of the furnace 1, thereby allowing a primary recovery of the waste heat of the exhaust gas.

Because the waste heat of the exhaust gas is to be radiated from the radiation body 9 toward the inside of the furnace 1, in order to prevent an undesirable decrease in the heat recovery efficiency, the arrangement of the partition walls 10 of the honeycomb structure, or the channels 8 defined by the partition walls 10, should be such that objects on one side of the radiation body 9 are not visible from another side of the radiation body 9 through the channels 8. Thus, as shown in FIG. 2, the partition walls 10 of the radiation body 9 are inclined with respect to the longitudinal axis of the exhaust gas duct 4, which extends perpendicularly to the heat radiation surface of the radiation body 9, at an angle within a range of from 5° to 60°, preferably from 15° to 30°.

For the same reason, when the radiation body 9 consists of a plurality of layers of honeycomb structures, as shown in FIG. 2, these structures are preferably arranged such that the channels 8 or partition walls 10 of one layer are contiguous with the channels 8 or partition wals 10 of at least one adjacent layer in a zig-zag fashion.

Advantageously, the radiation body 9 consists of two or three layers of a honeycomb structure, since provision of an excessive number of such layers results in an increased pressure drop of the exhaust gas. The honeycomb structure which may be suitably used in the present invention is typically featured by an equivalent channel diameter of 3 to 50 mm, a partition wall thickness of 1 to 10 mm, and an open frontal area of 30% or more. Also, the radiation body 9 has a typical overall thickness of 50 to 300 mm.

By making use of such a radiation body 9, it becomes possible to prevent accumulation, onto the surface of the partition walls 10, of dust contained in the exhaust gas and prevents the channels 8 from being clogged by the dust, and thus minimizes the pressure drop of the exhaust gas across the radiation body 9.

The radiation body 9, when heated by the exhaust gas, radiates heat not only toward the inside of the furnace 1, but also into the heat exchanger 3. However, by using the radiation body 9 formed with a plurality of inclined channels 8, as shown in FIG. 2, the exhaust gas flow speed along the surface of the partition walls 10, which faces the inside of the furnace 1, is greater than that along the opposite surfaces of the partition walls 10. This results in a difference in the resistance of heat transfer between the exhaust gas flow and the partition walls 10 through the boundary layer of the gas flow on both sides of the partition walls 10, by which the temperature on the surface of the partition wall 10, which faces the inside of the furnace 1, becomes higher than that on the opposite surfaces of the partition walls 10. Consequently, a substantail amount of the waste heat can be directly radiated toward the inside of the furnace 1, and the heat recovery efficiency can be improved.

FIG. 3 shows another embodiment of the present invention, wherein the same reference numerals used in FIGS. 1 and 2 denote the same or functionally equivalent elements. In this embodiment, the radiation body 9 is secured directly to the wall of the furnace 1 at a location corresponding to the exhaust gas discharge opening. Such an arrangement of the radiation body serves to improve the efficiency of the waste heat recovery by the radiation body, because the heat radiated from the radiation body 9 toward the inside of the furnace 1 is completely used to heat the furnace, and no part of the radiated heat is wasted to heat the exhaust gas duct 4.

The apparatus of the present invention explained above has been used for waste heat recovery in a heavy oil burning furnace with a capacity of 1,000,000 kcal/H, and the data so obtained is shown in the following table.

| | Radiation body | | | Exhaust gas temperature (°C.) | | | Exhaust gas pressure drop (mm Aq) | Input heat capacity (fuel) $10^3$ kcal/H | Waste heat capacity $10^3$ kcal/H | Thermal efficiency (%) |
| | Equivalent channel diameter (mm) | Angle of the channel (degree) | Number of layers | Outlet of the furnace | Inlet of the heat exchanger | Outlet of the heat exchanger | | | | |
| --- | --- | --- | --- | --- | --- | --- | --- | --- | --- | --- |
| 1 | 6 | 0 | 3 | 1,000 | 880 | 690 | 2 | 950 | 370 | 34 |
| 2 | 6 | 5 | 3 | 1,000 | 790 | 580 | 3.5 | 860 | 280 | 37 |
| 3 | 6 | 10 | 3 | 1,000 | 780 | 580 | 4 | 860 | 280 | 37 |
| 4 | 6 | 15 | 3 | 1,000 | 780 | 570 | 4 | 850 | 270 | 38 |
| 5 | 6 | 30 | 3 | 1,000 | 760 | 560 | 4 | 840 | 260 | 38 |
| 6 | 6 | 45 | 3 | 1,000 | 780 | 570 | 4.5 | 850 | 270 | 38 |
| 7 | 6 | 60 | 3 | 1,000 | 770 | 560 | 5 | 840 | 260 | 38 |
| 8 | 6 | 75 | 3 | 1,000 | 780 | 550 | 10 | 840 | 260 | 38 |
| 9 | 6 | 15 | 2 | 1,000 | 790 | 590 | 2.5 | 870 | 290 | 37 |
| 10 | 6 | 15 | 1 | 1,000 | 830 | 640 | 2.5 | 900 | 320 | 36 |
| 11 | 3 | 15 | 3 | 1,000 | 770 | 580 | 5.5 | 860 | 280 | 37 |
| 12 | 1 | 15 | 3 | 1,000 | 760 | 570 | 7 | 850 | 270 | 38 |
| 13 | 15 | 15 | 3 | 1,000 | 790 | 580 | 3.5 | 860 | 280 | 37 |
| 14 | 30 | 15 | 3 | 1,000 | 800 | 600 | 4 | 870 | 290 | 37 |
| 15 | 40 | 15 | 3 | 1,000 | 790 | 590 | 3.5 | 870 | 290 | 27 |
| 16 | 45 | 15 | 3 | 1,000 | 800 | 650 | 3 | 910 | 330 | 35 |
| 17 | 6 | 10–30 | 2 | 1,000 | 790 | 580 | 4 | 860 | 280 | 37 |
| 18 | 6 | 10–15–30 | 3 | 1,000 | 760 | 570 | 4 | 850 | 270 | 38 |
| 19 | — | — | — | 1,000 | 950 | 750 | 1.5 | 1,000 | 420 | 32 |

This data reveals that, in accordance with the present invention, the total heat quantity radiated from the radiation body 9 into the inside of the furnace 1 amounts to 30% or more of the holding heat capacity of the exhaust gas. Moreover, the heat of the exhaust gas which has passed through the radiation body 9 is further recovered by the heat exchanger 3 arranged on the downstream side of the radiation body 9 as shown in FIG. 1, so that the overall waste heat recovery efficiency of the furnace 1 can be improved up to about 60-70%.

Because the radiation body 9 consists essentially of a ceramic material, it can be used with a furnace whose inside is to be maintained at an extremely high temperature of 1,000 to 1,500° C. Formation of regular channels 8 in the radiation body 9 ensures that the pressure drop of the exhaust gas across the radiation body 9 can be minimized below 10 mm Aq or less, and thus the channels are prevented from being clogged by dust, and can be used for a long time without particular maintainance. Furthermore, the temperature of the exhaust gas passed through the radiation body 9 is decreased considerably, due to the primary waste heat recovery. Therefore, the thermal load to which the heat exchanger is subjected to can be reduced, and hence the heat exchanger does not need to be of an expensive structure.

The present invention thus provides a complete solution to various problems inherent to the conventional arrangement, wherein waste heat recovery is solely effected by a heat exchanger.

What is claimed is:

1. A waste heat recovery apparatus for recovering waste heat of an exhaust gas discharged toward an exhaust gas outlet of a high-temperature furnace, said apparatus comprising a radiation body which includes at least two ceramic material layers having a honeycomb structure with a plurality of partition walls, said plurality of partition walls defining a plurality of regular channels which extend through said radiation body from a first end thereof to a second end thereof, said plurality of regular channels permitting the passage of the exhaust gas therethrough, said first end of said radiation body being located adjacent to said exhaust gas outlet and directed toward an inside portion of the furnace, wherein each of said plurality of partition walls are inclined at an angle within a range of 5° to 60° with respect to an axis which is perpendicular to said first end of the radiation body.

2. The apparatus as claimed in claim 1, wherein said range of the inclination angle is 15° to 30°.

3. The apparatus as claimed in claim 1, wherein said radiation body comprises a plurality of ceramic material layers having a honeycomb structure, said partition walls being inclined with respect to said axis such that partition walls of adjacently stacked layers are arranged in a zig-zag fashion along said axis.

4. The apparatus as claimed in claim 1, further comprising a heat exchanger communicating with said second end of the radiation body, said heat exchanger being adapted to pre-heat fresh combustion air to be supplied to the furnace.

* * * * *